United States Patent

[11] 3,552,327

[72] Inventor Alfred L. Meyer
 Wood Dale, Ill.
[21] Appl. No. 788,882
[22] Filed Jan. 3, 1969
[45] Patented Jan. 5, 1971
[73] Assignee Anetsberger Brothers, Inc.
 a corporation of Illinois

[54] ALLIGATOR PASTRY FORMER
 6 Claims, 5 Drawing Figs.
[52] U.S. Cl. .................................................. 107/8, 107/69
[51] Int. Cl. ........................................ A21c 11/12
[50] Field of Search ............................ 107/7, 4.2, 8.6, 8.9, 69

[56] References Cited
UNITED STATES PATENTS

| | | | |
|---|---|---|---|
| 3,344,754 | 10/1967 | Artiaga et al. | |
| 1,071,592 | 8/1913 | Siegel et al. | 107/8(.9) |
| 1,804,296 | 5/1931 | Winkler | 107/8(.9) |
| 2,434,339 | 1/1948 | Stiles | 107/8X(.9) |

Primary Examiner—Louis K. Rimrodt
Attorney—Davis, Lucas, Brewer & Brugman

ABSTRACT: Machine for cutting dough snakes transversely of their movement on a conveyor in a plane forming an acute angle with conveyor and to a depth short of the conveyor and for transversely displacing the upper portions of the thus partially severed sections alternately in opposite directions to automatically form alligator pastry.

PATENTED JAN 5 1971

Inventor
Alfred L. Meyer
By
Davis, Lucas, Brewer & Brugman
Attys.

PATENTED JAN 5 1971
3,552,327
SHEET 2 OF 2
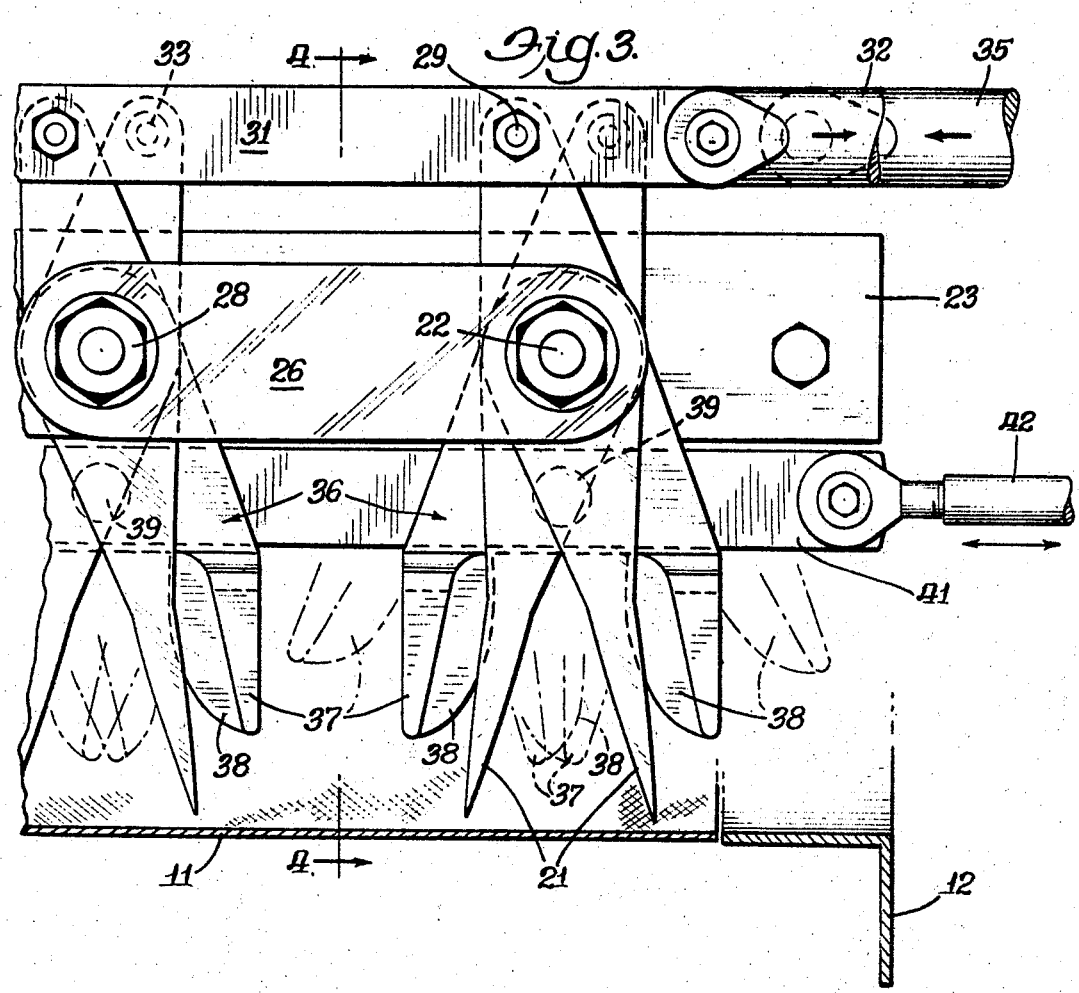
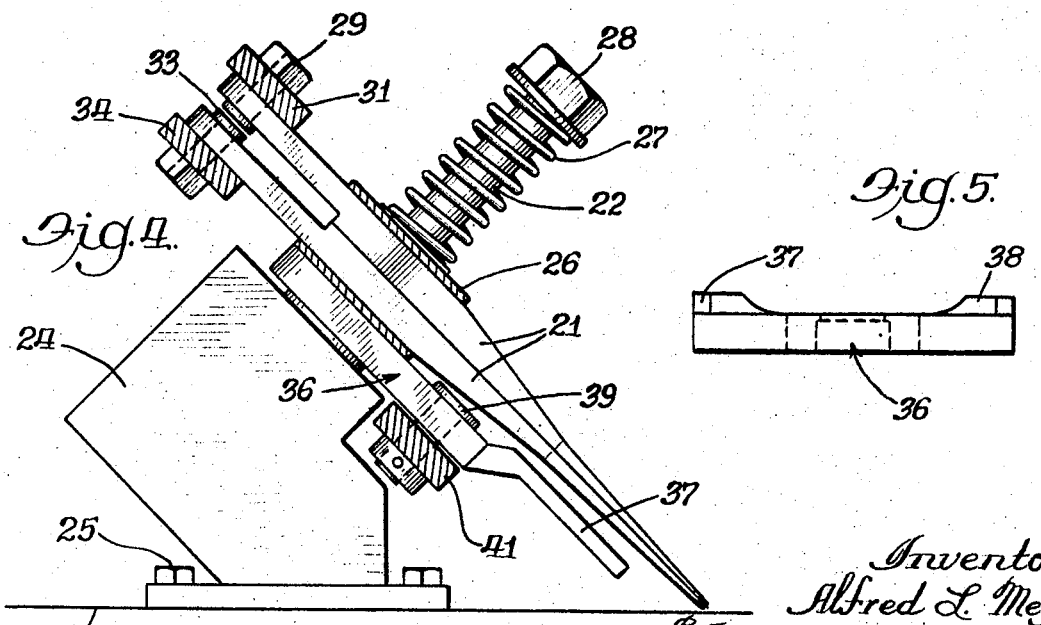
Inventor:
Alfred L. Meyer
By:
Davis, Lucas, Brewer & Brugman
Attys.

3,552,327

1

ALLIGATOR PASTRY FORMER

BACKGROUND OF THE INVENTION

1. Field of the Invention

This invention relates generally to pastry production, and more particularly to means for automatically forming alligator pastry.

2. Description of the Prior Art

Alligator pastry, which starts with a filled roll or snake of sheeted dough spread with filling or paste and coiled or wound, heretofore has had to be completed by hand, the baker cutting through the upper portion of the snake transversely at intervals spaced longitudinally of the roll with a pair of scissors and manually displacing the upper portions of the thus partially severed sections laterally and alternately in opposite directions. Consequently, the production of this type of pastry, sometimes known as Danish coffee cake, currently is expensive because of the labor cost involved.

SUMMARY OF THE INVENTION

This invention greatly reduces the cost of producing alligator pastry by providing mechanical means for automatically forming the same by cutting dough snakes transversely of their movement on a conveyor to a depth short of the conveyor and transversely displacing the upper portions of the thus partially severed sections alternately in opposite directions. Not only is the speed of production thereby tremendously increased, but a completely uniform product is assured, and selectively operable means is provided for varying the speed or frequency of operation of the forming means to produce such partially severed sections of desired length. In the Drawings:

FIG. 3 is a front elevational view of a portion of the snake cutting and displacing means;

FIG. 4 is a vertical section taken substantially on the line 4-4 of FIG. 3; and

FIG. 5 is a bottom end view of one of the dough pushers.

DESCRIPTION OF THE PREFERRED EMBODIMENT

Dough processing and pastry forming mechanisms for sheeting, filling and rolling or coiling to provide one or more snakes and moving the same longitudinally on a conveyor belt are well known. One such production system is disclosed in my copending application for U.S. Pat., Ser. No. 758,245, filed Sept. 9, 1968, which includes automatically and sequentially operable sheeting, cross-rolling, dough oiling, rotary cutting, filling or paste spreading, roll winding, and makeup or endless belt conveyor means that may be employed for such purpose.

Figure 1:
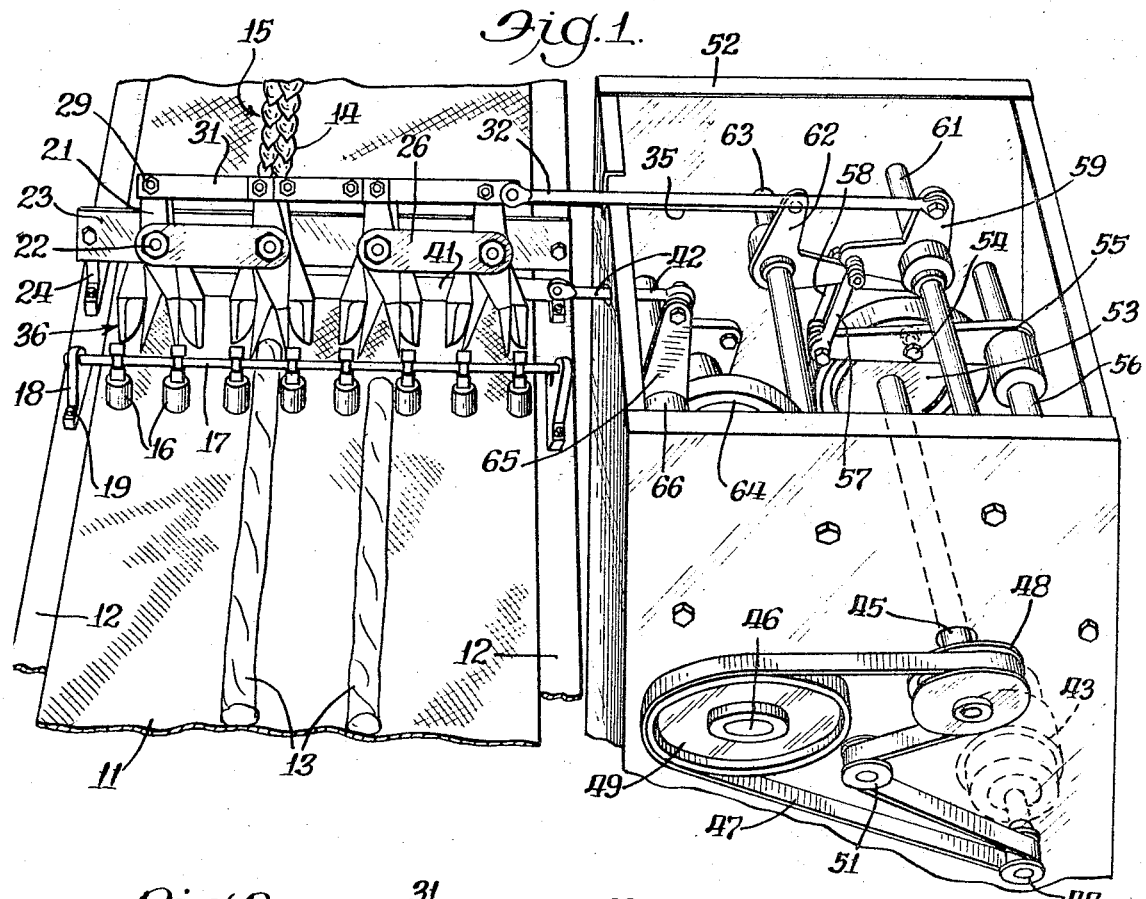
FIG. 1 is a perspective view looking downwardly and rearwardly upon an alligator pastry former incorporating the features of the invention.

Referring more particularly to FIG. 1 herein, a portion of such an endless belt conveyor is disclosed and identified by reference numeral 11 which is supported and moved longitudinally in well-known manner between suitable parallel frame members 12. The mechanisms referred to above can deliver one or more snakes 13 longitudinally disposed on the belt 11 and spaced laterally from each other to the mechanism of the instant invention for cutting the same transversely and laterally displacing the upper portions of the severed sections 14 alternately in opposite directions to automatically form alligator pastry as indicated generally at 15 in FIG. 1.

Figure 2:
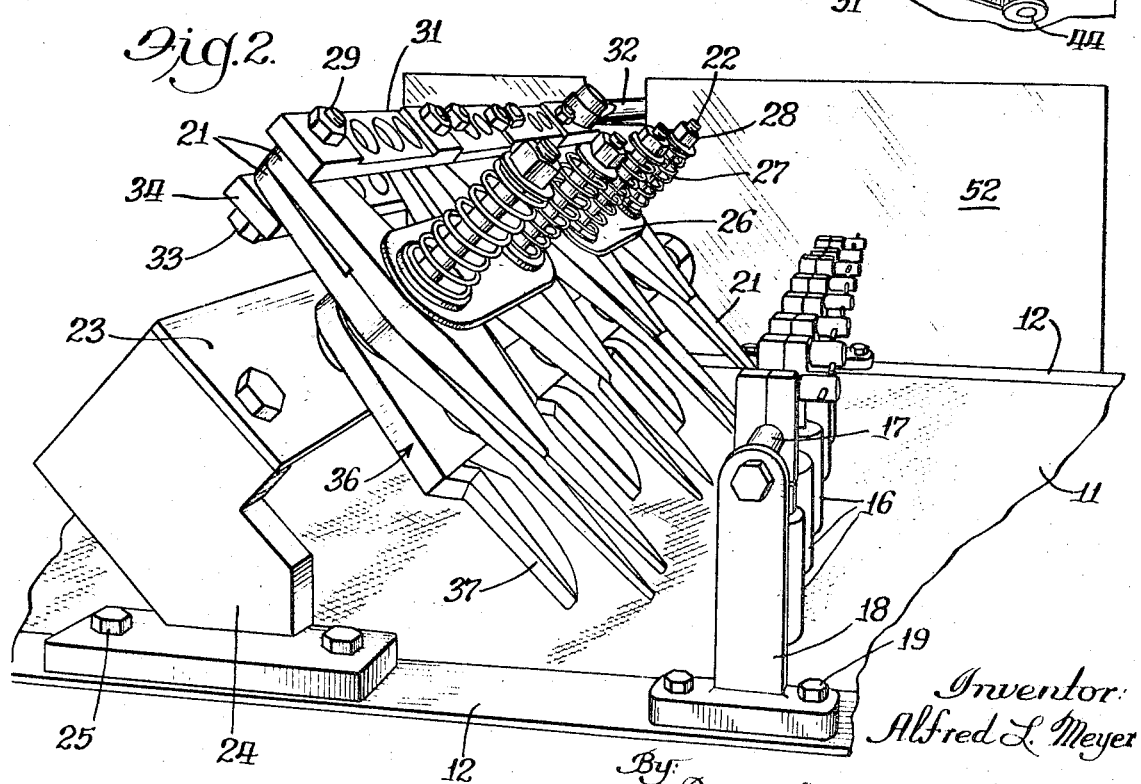
FIG. 2 is an end perspective view of the mechanism of FIG. 1, as seen from the left side thereof and on a somewhat larger scale.

To insure accurate positioning or disposition of the snakes 13 on the belt 11, guide means are employed which in the illustrated embodiment comprise four pairs of rollers 16 FIGS. 1 and 2) each freely rotatably mounted on a vertical spindle depending from, and adjustably secured in any suitable manner on, a transverse rod 17 in turn supported near its ends by brackets 18 secured by bolts 19 to the frame members 12.

2

Means for cutting the dough snakes 13 transversely to define the severed sections 14 are disposed directly adjacent the upper reach of the conveyor belt 11 and the dough exit side of the guide means comprising the vertical rollers 16. This snake cutting means includes a normally open pair of scissors made up of cooperating blades 21 aligned with each pair of guide rollers 16 which define a separate conveyor pathway to each pair of scissors. The two cutter blades 21 of each pair are identical, being reversed front-to-rear relative to each other in customary manner, and are pivotally mounted intermediate their ends above the conveyor 11 on a bolt or stud shaft 22. As best seen in FIGS. 2 and 4, the bolts 22 for the several pairs of scissor blades 21 preferably are angularly disposed so that the several blades cut in a plane defining an acute angle with that portion of the snake supporting surface of the conveyor belt 11 which lies under them, and as best illustrated in FIG. 3, the lower tips of the blades are spaced slightly above or short of that dough-supporting surface of the conveyor so that the severed sections 14 of each snake 13 remain joined at their lower ends after cutting by the blades.

The lower ends of the angularly disposed shafts or bolts 22 are supported by, and secured in any suitable manner to, a transversely extending plate 23 which is mounted parallel to the cutting plane of the blades 21 by end brackets 24 (FIGS. 2 and 4) secured by bolts 25 to the side frame members 12. A pressure plate 26 is slidably mounted on each of the laterally outer and next inwardly adjacent bolts 22 and is held against the associated pairs of blades 21 by a spring 27 and nut 28 on each of the bolts 22.

The upper ends of the forwardly disposed blades 21 of each pair of scissors are pivotally connected, respectively, at 29 to a laterally reciprocal bar 31, one end of which is connected to the inner end of a link 32 (FIGS. 1 and 3). Each of the other or rearwardly disposed blades 21 is similarly pivotally connected at 33 to a reciprocable bar 34 which is connected to the inner end of a link 35. As best seen in FIG. 3, simultaneous reciprocal movements of these links 32 and 35 in opposite directions, in a manner later to be described, thus will effect cutting or closing and opening operations of the several scissors or cutting means.

Also pivotally mounted on each bolt or stud shaft 22 is the upper portion of a dough pusher, indicated generally by reference numeral 36, which comprises means operating in timed relationship to the cutting means for automatically displacing the upper portions of the severed snake sections 14 transversely and alternately in opposite directions. To this end, the lower portion of each pusher means 36 comprises two depending finger portions 37 (FIG. 3) normally at rest on opposite sides of a snake passing through the associated guide rollers 16 and spaced laterally outwardly of the cutting edges of the associated scissor blades 21. As best seen in FIG. 4, these fingers 37 are offset forwardly (to the right therein) from the main body of the pusher 36 to dispose the same directly adjacent the cutting means or blades 21 on the dough exit side thereof. In order to properly perform its dough section lateral displacing function as the cut snake is translationally moved longitudinally therepast by the belt 11, the shape of the inner edge portion of the pusher fingers 37 has been found to be critical and to require a dough-engaging surface 38 (FIGS. 3 and 5) having a leading edge curving downwardly and laterally outwardly and a trailing surface curving forwardly (upwardly in FIG. 5) and laterally outwardly therefrom. These inner dough-engaging surfaces 38 on the two fingers 37 of each dough pusher 36 are shaped complementally to each other.

Each of the pushers 36 is pivotally secured at 39 in any suitable manner (FIGS. 3 and 4) to a laterally reciprocable bar 41 which is connected to the inner end of a link 42, whereby reciprocation of bar 41 will alternately move the pusher fingers 37 between their normal or inoperative full line positions of FIG. 3 and their fully extended operating positions in opposite directions transversely therefrom, as shown in FIG. 3 in broken lines. The upper portions of the severed dough sections 14 thus will be displaced transversely and alternately in opposite directions to produce the desired alligator form 15. To insure that the lower portions of the severed sections 14 remain joined, as previously noted, the blades 21 extend downwardly short of the dough supporting surface of the conveyor 11, and the lower ends of the pusher fingers 37 are disposed a further distance from that conveyor surface, as shown best in FIGS. 3 and 4.

For operating the links 32, 35 and 42 a suitable variable speed motor 43 (FIG. 1) is provided. The speed of rotation of the motor may be varied in well-known manner to determine the frequency of operation of those links to selectively determine the thickness of the severed sections 14. It will be appreciated, of course, that the thickness of the severed dough sections also may be varied by changing the speed of operation of the conveyor belt 11. The motor 43 is connected in any suitable manner to a drive pulley 44 which rotates two horizontal shafts 45 and 46 by means of a belt 47 drivingly engaging a pulley 48 on the shaft 45 and a pulley 49 on the shaft 46. An adjustable idler pulley also may be employed if desired. The shafts 45 and 46 are suitably journaled in the front and rear walls of an operating means housing 52 within which the motor 43 also preferably is disposed.

A blade actuating cam 53 is secured to the drive shaft 45 within the housing 52 and is provided with a groove or track cooperating with a follower 54 rotatably supported by, and extending rearwardly from, the central portion of an actuating lever 55. The outer end of this lever 55 is pivotally mounted in any suitable manner on a shaft 56 provided interiorly of the housing, and its inner end is pivotally connected to a pair of front and rear links 57 and 58, respectively. The front link 57 is pivotally connected at its upper end to a normally horizontal arm of a bell crank 59 which is pivotally supported by a suitable shaft 61 disposed within the housing 52. A normally substantially vertical arm of this bell crank 59 is pivotally connected in any suitable manner to the outer end of the forward link 32 for the forwardly disposed blades 21. The upper end of the rearward link 58 similarly is pivotally connected to one arm of a bell crank 62 which is pivotally mounted on a supporting shaft 63 and is pivotally connected to the outer end of the rearward link 35 for the rearwardly disposed blades 21.

In the illustrated embodiment of the invention, the track in the blade actuating cam 53 is circular concentrically with its center of rotation except for a rise subtending an angle of 94°. When the follower 54 is disposed in the circular portion of the track, the links 32 and 35 are held in their positions of the drawings which maintains the scissor blades 21 in their fully opened positions. As the rotation of the cam 53 causes the rise in its track to engage the follower 54, the lever 55 is moved first up and then down about its pivotal shaft 56 from its position of FIG. 1. The resulting lifting of the forward link 57 through the agency of the bell crank 59 moves the forward link 32 outwardly in the direction of the arrow shown in FIG. 3. Simultaneously, therewith, lifting of the rear link 58 through the agency of its bell crank 62 moves the rear link 35 inwardly in the direction of the arrow thereon in FIG. 3. Conversely, lowering of the inner end of the actuating lever 55 by the cam 53 simultaneously moves the links 32 and 35 in the directions opposite the arrows thereon in FIG. 3 to return the blades 21 to their normal open position.

Secured to the inner drive shaft 46 is a pusher actuating cam 64 having a track which cooperates with a follower mounted on one are arm of a bell crank 65 which is pivotally supported by a shaft 66 and the other arm of which is pivotally connected to the outer end of the pusher link 42. The major portion of the track of this cam 64, like that of the cam 53, comprises a circular dwell concentric with its center of rotation. Also like the cam 53, one portion of the track of cam 64 comprises a rise of from 60° to 75°. Diametrically opposite that rise, the cam track is provided with a fall portion which subtends the same angle selected in that range. Consequently, with the follower normally in the circular or dwell portion of the cam track, the pusher means 36 will be disposed in their normal inoperative full line positions of FIG. 3. As rotation of cam 64 occurs, the rise and fall portions of its track will alternately, through the agency of the bell crank 65 link 42 and bar 41, swing the pushers 36 to their operative broken line positions of FIG. 3 and back to normal inoperative position. As each dough pusher 36 is thus swung in one direction of the double arrow shown in connection with link 42 in FIG. 3, the dough-engaging surface 38 on one of its fingers 37 will displace the section 14 last severed by the cutting means laterally in the direction of such movement. The dough pushers 36 will then immediately be returned to their normal inoperative positions as the snake or snakes continue their longitudinal translational movement by the conveyor 11, and as quickly as the next section 14 is severed by the cutting means, the dough pushers 36 will be swung laterally in the opposite direction to displace that succeeding severed section transversely in that opposite direction.

It will be appreciated that the plate actuating cam 53 is rotated twice as fast as the pusher actuating cam 64, since alternate lateral swinging of the pushers 36 must follow in each instance a cutting operation of the blades 21. It also will be appreciated that the positioning of the cams 53 and 64 is such as to initiate such operative movements of the pusher means directly following cutting movements of the blades. As previously noted, the speed of operation of this operating mechanism may be varied with relation to the speed of translational movement of the dough snakes by the conveyor 11 to selectively determine the longitudinal thickness of the severed sections 14, but such variations in speed of operation will not change nor affect the relative timing of the actuations of the dough cutting and displacing means.

I claim:

1. An alligator pastry former, comprising means for partially cutting through dough snakes transversely to define separate sections having upper and lower portions which remain joined at the lower portions, means operating in timed relationship to said cutting means for automatically displacing the upper portions of said sections transversely and alternately in opposite directions and a conveyor having a surface for supporting said dough snakes and translationally moving the same longitudinally past said cutting means, wherein said cutting means comprises blades individually pivotally mounted above and extending downwardly short of said conveyor surface to cut said dough snakes in a plane defining an acute angle with said conveyor support surface and inclined downwardly and opposed to the direction of movement thereof.

2. An alligator pastry former according to claim 1, wherein said blades define normally open scissors, and actuating means for periodically closing and reopening said scissors to effect the desired cutting actions.

3. In an alligator pastry former according to claim 2, selectively adjustable means for varying the frequency of operation of said actuating means to determine the length of said sections.

4. An alligator pastry former according to claim 3, wherein said cutting means comprises a plurality of pairs of scissors blades pivotally mounted above said conveyor surface, and said guide means comprising rollers mounted on vertical axes above said surface to define a separate conveyor pathway to each said pair of scissors.

5. An alligator pastry former according to claim 1, wherein said means for displacing the upper portions of said sections is disposed adjacent said cutting means on the dough exit side thereof and comprises pushers normally at rest on opposite sides of said snakes and transversely movable relative thereto and operating means for alternately moving said pushers between normal positions and operating positions in opposite directions therefrom.

6. An alligator pastry former according to claim 5, wherein said pushers on opposite sides of said snakes have inner dough-engaging surfaces shaped complementally to each other and each having a leading edge curving downwardly and laterally outwardly and a trailing surface curving forwardly and laterally outwardly therefrom.